United States Patent Office 3,502,607
Patented Mar. 24, 1970

3,502,607
ART OF MAKING DYEABLE POLY-
ACRYLONITRILE PRODUCTS
Louis E. Trapasso, Westfield, N.J., assignor to Celanese
Corporation, New York, N.Y., a corporation of
Delaware
No Drawing. Filed Oct. 31, 1966, Ser. No. 590,460
Int. Cl. C08f 45/46, 29/54, 47/12
U.S. Cl. 260—32.6                    17 Claims

ABSTRACT OF THE DISCLOSURE

The invention is directed to polyacrylonitrile compositions containing an adduct of certain polymeric cyclic ethers and a specified sultone which adducts render the acrylonitrile polymer dyeable with cationic dyes. The adducts function as both dyesites for cationic dyes and dye diffusion promoters in the noted polymer. The shaped article, such as a fiber, and method of producing is also claimed.

---

This invention relates broadly to the art of making dyeable polymers and shaped polymeric articles, and more particularly to technique whereby polymeric (homopolymeric and copolymeric) acrylonitrile is rendered dyeable with cationic dyes. The invention is based on my discovery of a new adduct that is capable of functioning both as a dye site for cationic (basic) dyes and as a dye-diffusion promoter in polymers having little or no cationic dye-receptivity, and by which is meant specifically homopolymeric and copolymeric acrylonitrile and shaped articles made therefrom having such dye-resistant characteristics. The scope of the invention includes composition, article, and method features.

It is known that homopolymeric acrylonitrile and copolymers of acrylonitrile into which no dye sites have been introduced chemically (i.e., as an integral part of the polymer molecule) or by blending with a polymer containing dye sites are extremely difficult to dye satisfactorily with conventional acid and basic dyes. Various and sundry means have been suggested and are in use for overcoming or minimizing the problem of dyeing acrylonitrile polymers effectively and economically without adversely affecting the other useful and/or commercially desirable properties of shaped articles (e.g., films, filaments, etc.) fabricated from the polymers. The present invention is a different solution to the problem of dyeing dye-resistant polymers, specifically acrylonitrile polymers, with a basic dye and which has certain advantages over the prior-art techniques.

Accordingly, it is one of the primary objects of the present invention to provide new compositions of matter, including a new cationic dye-receptive adduct adapted for blending with a dye-resistant polymer such as, for example, homopolymeric and copolymeric acrylonitrile.

Another object of the invention is to provide blends of a dye-resistant polymer, e.g., an acrylonitrile polymer, and a compatible cationic dye-receptive adduct that also functions as a dye-diffusion agent.

Still another object of the invention is to provide cationic dye-receptive compositions, more particularly blends of a dye-resistant polymer and a compatible dye-receptive adduct, that can be spun, cast, or otherwise shaped to form filaments (mono- or multifilaments), films, rods, tubes, bars, ribbons, tapes, sheets, yarns, tows, and the like, and the shaped articles then dyed either before or after having been oriented (e.g., by stretching) and/or made into fabrics in knitted, woven, felted, or other form.

Still other objects of the invention are to provide methods of making the new compositions and shaped articles of the invention.

Other objects of the invention will be apparent to those skilled in the art from the description and examples that follow.

In general, the objects of the invention are attained by incorporating into a dye-resistant polymer, such as an acrylonitrile polymer, an adduct of (a) a particular polymerized cyclic ether with (b) a sultone of a particular class; and shaping the resulting composition to form useful articles of manufacture such as those hereinbefore mentioned by way of illustration. The polymerized cyclic ether used in making the adduct also may be designated as a "poly(alkylene oxide)."

In forming the cationic dye-receptive adduct there is utilized a sultone selected from the group consisting of the naphthasultones and sultones represented by the general formula I 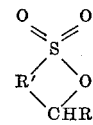

wherein R represents hydrogen or a lower alkyl radical and R' represents an alkylene (including cycloalkylene) or arylene radical containing from 1 to 6 carbon atoms, inclusive.

Illustrative examples of lower alkyl radicals represented by R in Formula I are methyl, ethyl, and the normal and isomeric forms of propyl through hexyl radicals. Illustrative examples of radicals represented by R' in Formula I are methylene, ethylene, and the normal and isomeric forms of propylene through hexylene radicals; the cyclopentylene and the cyclohexylene radicals; and the phenylene radical. Advantageously the total number of carbon atoms in the combined groups represented by CHR and R' in Formula I does not exceed about 10 carbon atoms and usually is not more than about 7 carbon atoms.

More specific examples of sultones that are useful in making the adducts herein involved are the following:

1,8-naphthosultone, the formula for which is

II 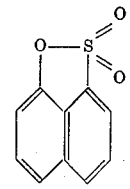

α-Hydroxy-o-toluenesulfonic acid sultone, the formula for which is

III 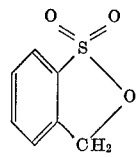

4-hydroxy-1-butanesulfonic acid sultone
3-hydroxy-1-propanesulfonic acid sultone (also known as 1,3-propane-sultone)
3-hydroxy-1-octanesulfonic acid sultone
4-hydroxy-1-pentanesulfonic acid sultone
4-hydroxy-2,2,4,4-tetramethylbutanesulfonic acid sultone
5-hydroxy-1-pentanesulfonic acid sultone
6-hydroxy-1-hexanesulfonic acid sultone The other reactant employed in preparing the adduct is a polymer of a cyclic ether selected from the group consisting of ethylene oxide (1,2-epoxyethane), propylene oxide (1,2-epoxypropane), tetrahydrofuran (tetramethylene oxide), and mixtures thereof in any proportions. The molecular weight of the polymer of the cyclic ether, as determined by vapor phase osmometry, is within the range of from about 500 to about 5000. The polymers of the cyclic ethers (alkylene oxides) that are not commercially available are prepared in known manner, for instance, as described in "Preparation Methods of Polymer Chemistry" by Wayne Sorenson and Tod W. Campbell, Interscience Publishers, Inc. 1961, p. 247.

Broadly described, the adducts of the invention are prepared by contacting, in the liquid phase and at a suitable temperature, the monoalkoxide and/or dialkoxide of one or more polymers of a cyclic ether of the aforementioned kind with a naphthosultone or a sultone of the kind embraced by Formula III. A plurality of sultones may be used if desired. Suitable contacting temperatures for effecting reaction are temperatures ranging from ambient temperature to about 150° C. Lower or higher temperatures may sometimes be necessary or desirable because of various influencing factors such as the choice of the reactants employed in making the adduct and the particular equipment available for carrying out the reaction.

In the preparation of the adduct, the polymer of the cyclic ether is first reacted with from 1 to 2 moles of an alkali metal, specifically metallic sodium, for each mole of the aforesaid polymer. When the reactants are employed in equal molar proportions, a monoalkoxide of the polymer of the cyclic ether is obtained. When the metallic sodium is used in twice the equimolar amount, the product is predominantly (if not almost entirely) a dialkoxide of the polymeric cyclic ether. At intermediate proportions (i.e., between equimolar and twice equimolar amounts) of the alkali metal, the product is a mixture of the monoalkoxide and dialkoxide of the poly(alkylene oxide). Upon the addition of the stoichiometrical quantity of a sultone of the kind used in this invention to the alkoxide or to a solution thereof, an exothermic reaction takes place with the formation of the adduct.

The crude adduct may be used, without purification, as an additive to a solution of a dye-resistant polymer, e.g., homopolymeric or copolymeric acrylonitrile. From such solutions are then made shaped articles such as films, filaments, and the like.

In a different procedure the mono- or dialkoxide of the poly(alkylene oxide) is formed by adding an aqueous solution of an alkali-metal hydroxide, specifically sodium hydroxide, to the poly(alkylene oxide) dissolved in an organic solvent in which it is inert, e.g., benzene, toluene, xylene, or other inert solvent for a poly(alkylene oxide). The water is separated by azeotropic distillation. The resulting dispersion of the alkoxide of the poly(alkylene oxide) in the inert organic solvent is cooled to ambient temperature. To the cooled dispersion is added a sultone of the kind previously defined. An immediate reaction occurs, yielding a gelatinous reaction mass, more particularly when the organic solvent is a mixture of benzene and xylene and the sultone is 1,3-propane sultone.

The gelatinous reaction product comprising the adduct and organic solvent may be employed as an additive to a solution of an acrylonitrile of other dye-resistant polymer in the same manner as previously has been described with reference to the alternative method of preparing the adduct. Or, as desired or as may be required because of the non-compatibility of the solvent employed in dissolving the polymer and the solvent used as a reaction medium in forming the adduct, the latter solvent may first be removed from the crude adduct, e.g., by direct distillation (using vacuum if necessary). The dried adduct is then incorporated into dye-resistant polymer, for instance, by adding it to a solution of the said polymer.

Although not limited thereto, the present invention is especially applicable in imparting cationic dye-receptivity to homopolymers and copolymers of acrylonitrile. The acrylonitrile copolymers may be binary, ternary, or higher multi-component copolymers.

The acrylonitrile polymer (homopolymer or copolymer) is prepared in known manner, using bulk, solution, suspension, or emulsion polymerization techniques, and preferably with the aid of some form of catalytic influence including heat, light, irradiation, catalysts, or various combinations thereof as desired or as may be required.

Any of the catalysts, especially those of the so-called "free-radical" type, commonly employed in polymerizing compounds containing an ethylenically-unsaturated grouping, specifically a vinyl grouping, can be used. Such catalysts include the various organic and inorganic peroxy compounds, more particularly the organic peroxides, e.g., tert.-butyl hydroperoxide, the salts of inorganic per-acids, e.g., ammonium persulfate, sodium persulfate and potassium persulfate; the azo-type catalysts, e.g., $\alpha,\alpha'$-azodiisobutyronitrile; and the various redox-catalyst systems, e.g., ammonium or potassium persulfate and sodium metabisulfite, sodium chlorate and sodium sulfite, as well as others known in the art.

For additional details on polymerization techniques generally applied in preparing the homopolymers and copolymers involved in this invention, reference is made to U.S. Patent No. 3,180,857 of Conciatori and Smart, dated Apr. 27, 1965, and assigned to the same assignee as the present invention, especially column 5, lines 17–73 thereof, and wherein methods for the preparation of certain copolymers of vinylidene cyanide are described.

Illustrative examples of comonomers, one or more of which may be copolymerized to form copolymers that can be improved in cationic dye-receptivity by practicing the present invention are the vinyl esters of aliphatic monocarboxylic acids, e.g., vinyl acetate; vinyl esters of the class exemplifield by vinyl benzoate, the various vinyl chlorobenzoates and the various vinyl methoxy-, ethoxy-, and higher alkoxybenzoates; styrene, and substituted styrenes such as $\alpha$-methylstyrene, $\alpha$-chlorostyrene, 2,5-dichlorostyrene, p-methoxystyrene, and p,$\alpha$-dimethylstyrene; olefins of the class exemplified by isobutylene, 2-methyl-1-butene, 2-methyl-1-pentene, 2,6-dimethyl-1-octene, and 2,3,3-trimethyl-1-butene; alkyl esters of acrylic and methacrylic acids, e.g., methyl acrylate and methacrylate, ethyl acrylate and methacrylate, and the higher alkyl homologues of acrylic and methacrylic acids; 2-halogenated olefins of the class exemplified by 2-chloroprene, 2-chlorobutene, and 2-fluorobutene; isopropenyl esters of organic monocarboxylic acids, e.g., isopropenyl acetate, isopropenyl benzoate, and isopropenyl $\alpha$-chloroacetate; vinyl esters of $\alpha$-halogeno saturated aliphatic monocarboxylic acids of the class exemplified by vinyl $\alpha$-chloroacetate; vinyl and vinylidene halides such as vinyl chloride, vinyl bromide, vinylidene chloride, vinylidene fluoride, and the like; vinylidene cyanide; methacrylonitrile, ethacrylonitrile, and higher alkylacrylonitriles of the homologous series; amides of acrylic and methacrylic acids, e.g., the methyl, ethyl, and propyl through amyl (both normal and isomeric forms) acrylamides and methacrylamides, and the N-methyl-, -ethyl-, -propyl-, -butyl-, etc., and the N,N-dimethyl-, N-N-diethyl-, N,N-dipropyl-, and N,N-dibutyl-acrylamides and -methacrylamides.

Other examples of the foregoing classes of comonomers are set forth generically, and with other species than those mentioned above, in the aforementioned Patent No. 3,180,857, and particularly in column 1, line 26, through line 72 in column 3; and which are described in the said patent as being monomers useful in forming copolymers or interpolymers with vinyldene cyanide.

The following may be stated with respect to the proportions of comonomers in the copolymer. For ease in description and not by way of limitation, acrylonitrile will be taken as illustrative of a terminal ethylenically-unsaturated monomer that is copolymerizable with other ethylenically-unsaturated monomers that are free from basic dye sites, and which may be mono- or poly-unsaturated and terminal or non-terminal ethylenically-unsaturated, thereby to form cationic dye-resistant copolymers that can be made receptive to cationic dyes by practicing the present invention.

In the case of acrylonitrile (AN) copolymers it is usually desirable, in order to secure optimum benefit from the presence of AN in the copolymer structure, that the acrylonitrile constitute at least about 85%, of the mers or units in the copolymer. The comonomer may constitute any percentage above 85% up to but less than 100%, e.g., up to and including 99.9%. Normally the benefits usually sought by copolymerizing acrylonitrile with a different comonomer are not attained unless the latter constitutes at least 1 or 2%, preferably at least between 3 and 5%, of the total mers in the copolymer. The aforementioned lower limit of 85% AN is subject to further reduction, for example down to about 40% AN, when the desired copolymer is amenable to forming into shaped articles such as those now generically designated as "modacrylic" fibers. It will be understood, of course, by those skilled in the art that the copolymer employed in making the modacrylic fiber must be fiber-forming (fiber-formable), which necessitates that the comonomer(s) used with the acrylonitrile monomer must be so chosen and used in such an amount that the resulting copolymer is a fiber-forming copolymer.

In producing the blended compositions of this invention, the cationic dye-resistant polymer (e.g., a homopolymer of acrylonitrile and/or an acrylonitrile copolymer such as those described in the preceding paragraph) and the sultone adduct of the poly(alkylene oxide) are blended together in proportions such that the latter imparts cationic dye-receptivity to the former, the net result being that the blended product becomes cationic dye-receptive.

The proportions of the respective components of the blend may be varied widely, but generally the sultone adduct constitutes, by weight, from 1% to about 25%, more particularly from 2 or 3% to about 20%, and preferably from about 5% to about 15%, of the total amount of the dye-resistant polymer (e.g., homopolymeric or copolymeric acrylonitrile) and the sultone adduct.

In general, the higher amounts of the sultone adduct are employed in the blend when the dye-resistant polymer is (a) a homopolymer (e.g., homopolymeric acrylonitrile) or (b) a copolymer containing a minor amount (e.g., less than about 5 weight percent) of one or more components that are either (1) less dye-resistant per se than is the main component or (2) function as a dye-diffusion agent. An example of the latter type of copolymer is a copolymer of acrylonitrile and from 0.1% to less than about 5% (e.g., 4.5%) of methyl acrylate or vinyl acetate, these percentages being by weight and based on the monomeric charge. In other words, the less that the copolymer is cationic dye-resistant (i.e., the more the copolymer is cationic dye-receptive), the less is the amount of sultone adduct that is incorporated into the blend.

Any suitable method of blending the sultone adduct and the dye-resistant polymer to form a substantially homogeneous composition may be employed. For example, the finely divided solids may be dry-blended together using commerically available mixing equipment, or they may be dissolved in a common solvent and admixed in solution (including dispersed) state.

Taking polymeric (homopolymeric or copolymeric) acrylonitrile as illustrative of a dye-resistant polymer which, together with a sultone adduct of a poly(alkylene oxide), is to be dissolved in a common solvent, it may be stated that the solvent should be one in which both the polymeric acrylonitrile and the sultone adduct are soluble (substantially soluble) at least at the application temperature, more particularly at the extrusion temperature when the solution is to be extruded through an opening to form filaments, films, or the like. To the best of my knowledge and belief any solvent for polymeric acrylonitrile will also function as a solvent for the sultone adduct, or at least will provide such a fine state of dispersion of the adduct in the solution of the acrylonitrile polymer that the adduct-modified solution will be useable for its intended purpose.

Suitable solvents, more particularly organic solvents, for making solution blends of the sultone adduct and the polymeric acrylonitrile are disclosed in U.S. Patents 2,404,713–728 directed to organic-solvent solutions of homopolymeric acrylonitrile and copolymers of at least 85% by weight of acrylonitrile with another monomer, and to the use of such solutions in making films, filamentary materials, and the like. Specific examples of organic solvents that may be employed in making such blends are dimethylformamide, N,N-dimethylacetamide (DMA), dimethylsulfoxide, dimethylsulfone, ethylene thiocyanate, trimethylene thiocyanate, ethylene carbonate and propylene carbonate.

In the preferred technique for effecting solution blending, the crude sultone adduct is added to a solution of the polymeric acrylonitrile. The dissolution of the acrylonitrile polymer in the solvent, more particularly an organic solvent, is accelerated by using a polymer that is in finely divided state, e.g., one which, if not in finely divided state as originally formed, has been ground so that all or substantially all of it will pass through a U.S. Standard Sieve Series No. 50 screen. It is also usually desirable to agitate the mass, as by mechanical stirring, while dissolving the polymer in the solvent. To avoid or minimize discoloration of the acrylonitrile polymer, it is also desirable to employ the lowest possible temperature in effecting dissolution thereof that is consistent with practical considerations, e.g., the time required for effecting solution, etc. Dissolution temperatures below about 100° C. are advantageous, and preferably the maximum temperature of dissolution is kept within the range of 60°–90° C. providing the solvent is a liquid at that temperature; otherwise, at the lowest maximum temperature that will liquify the solvent and maintain it in liquid state.

After adding the sultone adduct to the dissolved acrylonitrile polymer, agitation and heating as described above are continued until a substantially homogeneous liquid composition or blend has been obtained.

The proportions of the blended solids (i.e., sultone adduct plus dye-resistant polymer, specifically acrylonitrile polymer) are generally such that the solution contains from about 5 to about 35, and preferably from about 10 to about 25 or 30 weight percent of the aforementioned solid components of the blend. Solids concentrations within this more limited range, especially at the higher limits of the range, are particularly desirable when the modified polymeric composition of this invention is to be used in the spinning of filaments or in the casting of films. Good results have been obtained when the aforesaid modified polymeric composition constituted about 20% by weight of the solution.

As will be readily understood by those skilled in the art, the aforementioned ranges of concentration are mentioned as indicative of concentrations that may be employed, and the invention obviously is not limited to the use of only such concentrations. Especially in spinning and casting applications of the compositions, the important factor is that the concentration of the above-described polymeric components in the solvent be such that the viscosity of the liquid composition at the operating temperature is within a workable range.

Satisfactorily viscosities at the usual operating temperatures generally prevail when the total polymeric solids (i.e., sultone-adduct plus dye-resistant polymer) in the solution constitute from about 10 to about 25 or 30 weight percent of the solvent (more particularly organic-solvent) solution thereof. However, this is dependent upon various influencing factors such as the relative proportions of sultone adduct and polymeric acrylonitrile and/or other dye-resistant polymer in the solution, and the particular molecular weight within the range of from 500 to 5,000 of the cyclic ether of which the sultone-adduct is made and then used as a component of the solution. However, a greater influencing factor in determining the concentration of solids in the solution is probably the average molecular weight of the dye-resistor polymer prior to modification thereof with the sultone adduct.

Taking a homopolymer or copolymer of acrylonitrile as illustrative of the unmodified (i.e., unmodified with a sultone adduct) dye-resistant polymer, it may be stated that its average molecular weight usually exceeds about 10,000, advantageously exceeds about 20,000, and preferably is within the range of from 40,000 or 50,000 to 150,000 or 200,000, or even 250,000 or 300,000 or more, as determined from viscosity measurements and calculations by the Staudinger equation. For some applications it may sometimes be desirable to prepare and use an acrylonitrile polymer having a molecular weight of even 500,000 or 1,000,000 or more (Staudinger method; reference: U.S. Patent No. 2,404,713).

The inherent viscosity (I.V.) of the solution of dye-resistant polymer (specifically, homopolymeric or copolymeric acrylonitrile) modified with the sultone adduct of the kind used in practicing this invention is at least 0.5, advantaveously from about 1 to about 3, and preferably from about 1.0 to about 2.0 as measured in a 0.1 weight percent concentration of the modified polymer composition in DMF at 25° C.

Because the use of the higher amounts of solvents renders spinning operations more costly and difficult due to the trouble often encountered in rapidly removing large amounts of solvent from the solution and due to the cost of such removal, it is preferable to use a modified polymeric composition wherein the initially dye-resistant polymeric component thereof, e.g., an acrylonitrile polymer, has a molecular weight such that a miximum amount of the AN polymer, consistent with the viscosity of the solution at the operating temperature, can be dissolved in the chosen solvent, e.g., an organic solvent such as DMF, DMA, dimethylsulfoxide (DMS), and the like. By using, for eaxmple, an acrylonitrile polymer having an average molecular weight (Staudinger method) within the range of from about 40,000 or 45,000 up to about 150,000 or 160,000, it is possible to obtain solutions containing, for instance, from 7 or 8% to 25–30% by weight of the sultone-adduct-modified AN polymer, and having suitable viscosities for use at operating temperatures of the order of, for example, 70° C. to 150° C.

The above-described solutions of the sultone-adduct-modified polymeric compositions may be used in the production of various fabricated articles or structures such as, for example, films, filaments, bars, rods, tubes, etc., in accordance with general techniques now well known to those skilled in the art, the detailed operating conditions being suitably modified where required. Such technique usually involves extruding the solution containing the polymeric acrylonitrile (or other dye-resistant polymer) modified with the sultone adduct of the poly-(alkylene oxide) through an opening of predetermined cross-section into a liquid non-solvent for the said modified polymer thereby to form a shaped article.

Describing the method of making shaped articles from the solutions (liquid compositions) of this invention more specifically, it may be stated that, in one method of making extruded articles, the solution (advantageously heated to, for instance, 70°–130° C. after having been previously deaerated and filtered) is extruded through a spinneret or die into a liquid non-solvent that will coagulate the polymeric solids component of the extrudable composition, more particularly spinning solution. The liquid into which the spinning solution is extruded is one which is miscible with the organic or other solvent component of the solution and which, as a result of extracting the solvent, is capable of coagulating the dissolved polymeric solids. Any liquid which is thus capable of coagulating the aforesaid polymeric solids may be employed, but preferably the liquid coagulant is one that has no harmful effect upon the blended components of the polymeric composition.

Thus, when the solvent component of the spinning solution is an organic solvent such as, for example, dimethylacetamide (DMA), the liquid coagulant may be, for instance, water or almost any aqueous salt solution, e.g., the alkali-metal (specifically the sodium and potassium) and the ammonium chlorides, bromides, sulfates, nitrates, phosphates, acetates, and propionates, as well as water-soluble salts of divalent and trivalent cations, e.g., zinc chloride, calcium chloride, calcium thiocyanate, and their obvious equivalents.

The liquid coagulant that is suitable for use with a particular solvent solution of the modified polymeric material is readily ascertained by checking the literature or by simple experimentation as to those compounds or substances in which the chosen solvent (e.g., organic solvent) component of the spinning solution is soluble at a suitable, operating bath temperature and in which the modified polymer that is a component of the spinning solution is sufficiently insoluble to permit coagulation thereof in a relatively short period of time.

The temperature of the coagulating or precipitating bath may be varied as desired or as conditions may require depending upon the chosen organic or other solvent component of the spinning solution and the chosen liquid coagulant. Generally, the coagulating bath temperature is within the range of from about 0°–10° C. to about 100° C., and is preferably not higher than about 70° or 80° C. in order to minimize discoloration of the coagulated polymeric material.

It will be understood, of course, by those skilled in the art that the temperature of the liquid coagulating bath (sometimes called a "spin" bath) should be such as to dissolve the solvent from the extruded mass most rapidly and effectively. The length of travel of the shaped article through the bath may be varied as desired or as may be required by the other particular operating conditions. However, in all cases the length of travel should be sufficient to effect solidification of the modified polymeric material and to extract from the extruded mass substantially all of the solvent; or if desired, only a part of the solvent so that, for example, from 0.5 to 1% to 15 or 20% or more, by weight of the whole, remains in the extruded mass as a fugitive or permanent plasticizer of the aforesaid polymeric material, specifically a sultone-adduct modified acrylonitrile polymer.

The spun filamentary material or other extruded article is preferably treated in, or after leaving, the coagulating bath in order to orient the molecules along the fiber axis and thereby to increase the tensile strength and otherwise improve the properties of the spun material. Orientation may be effected by stretching the thread or strand at any suitable stage of the spinning operation but preferably while the spun filament or thread still contains at least some of the solvent. Stretching may be accomplished by passing the thread of yarn between two or more positively driven rolls or godets, the peripheral speeds of which are adjusted so that the thread, yarn, tow, or the like is stretched to the desired degree.

The amount of stretch that is applied to the filamentary material may be varied widely, but in all cases should be sufficient to cause at least appreciable orientation of the molecules along the fiber axis and an improvement in the properties of the material undergoing treatment. The amount of tension to which the filamentary material is subjected should not be so great as to cause it to break (i.e., appreciable or substantial breakage of the individual filaments of the strand or yarn). Depending, for example, upon the type or kind of material being stretched and the particular properties desired in the finished product, the amount of stretch may vary, for instance, from 100%, preferably from 200 or 300%, up to 600 or 700%, or more of the original length of the filamentary material.

The stretch may be applied gradually by passing the strand or the like over a plurality of godets having increasing peripheral speeds. The stretched filamentary material may be wound upon a spool or it may be collected in a centrifugal pot, whereby twist advantageously is applied to the filamentary bundle. Alternatively, the stretched filamentary material may be led over a thread-storage device on which it may be treated with a suitable solvent to remove all or part of the coagulant and/or organic (or aqueous inorganic) solvent component of the spinning solution that may not previously have been removed, after which it may be continuously dried, oiled and taken up on a twisting device, such, for instance, as a ring-twisting spindle.

The extruded filamentary material may be given part or all of its total stretch in a liquid medium such as that which constitutes the coagulating bath, or in any other suitable medium, and at a suitable temperature. Thus, the stretch may be applied while the yarn or the like is being passed through a gaseous medium, e.g., air, nitrogen, flue gases, etc., or through a liquid medium, e.g., water, or such media as are employed for coagulating the sultone-adduct-modified polymeric component of the spinning solution. To obviate or minimize discoloration of the said polymeric component, the temperature of the medium in which the filamentary material is stretched and its rate of travel therethrough should be adjusted so that overheating of the material does not occur. Ordinarily the temperature of the medium in which stretching is effected is below 200° C., e.g., at 70° to 140° C.

The highly stretched product is strong, tough and pliable, and shows a high degree of orientation along the fiber axis by X-ray diffraction.

Instead of forming a shaped article such as filamentary material by a wet-spinning method as previously has been described, the filamentary material may be produced by dry-spinning technique. This technique is more fully described and illustrated by specific examples directed to dry-spinning of organic-solvent solutions of homopolymeric acrylonitrile and copolymers of acrylonitrile, different from those with which this invention is concerned, in U.S. patents included in the previously mentioned patent group, viz., 2,404,713–728.

The solvent solutions of the sultone-adduct modified polymers, specifically acrylonitrile polymers, with which this invention is concerned also can be cast in the form of films. For instance, the hot liquid composition may be cast upon a revolving drum which is partly immersed in a coagulating bath, such as mentioned hereinbefore, and which will serve to deposit the aforesaid modified polymer as a thin film on the drum as it passes through the bath. The resulting film may be stretched, if desired, lengthwise and crosswise by suitable, commercially available apparatus to improve its properties.

The cationic dye-receptive polymers with which this invention is concerned may be dyed with a basic dye while they are still in upshaped form; or, they may first be shaped, e.g., in the form of filamentary materials which are subsequently dyed either before or after they have been made into fabrics, clothing and the like.

One of the main advantages accruing from the use of a sultone adduct of a poly(alkylene oxide) of the kind with which this invention is concerned in imparting cationic dye-receptivity to a cationic dye-resistant polymer, e.g., homopolymeric or copolymeric acrylonitrile, is that it is capable of functioning both as a source of dye sites and as a dye-diffusion promoter. Consequently, if desired, one can eliminate the introduction or reduce the amount of such a promoter by copolymerizing as heretofore has been the common practice, (a) acrylonitrile and the like that alone yield dye-resistant polymers with (b) a comonomer which, as an integral part of the copolymer molecule, is capable of functioning as a dye-diffusion promoter.

Hence, by practicing this invention there can be avoided the need to attempt to copolymerize monomers that may have different copolymerization rates and the attendant difficulties in securing copolymers having a substantially uniform average molecule weight from day-to-day (and with relatively small fractions at both the lower and higher levels of the range) that is usually established as a standard in making shaped articles such as filaments therefrom. As will be readily appreciated by those skilled in the polymerization art, this is a matter of considerable practical and economic importance.

Thus it will be seen that the present invention provides a valuable aid in obtaining polymeric products and shaped articles therefrom having uniform characteristics that meet the manufacturer's standards and the demands of the trade; and reduces costs for example by simplifying the manufacturing procedure since the modification of the dye-resistant polymer involves merely a simple blending step; and, also, by eliminating or minimizing the production of off-standard polymer that either as such or in the form of shaped articles made therefrom has a lower market value and has to be sold at a lower price than products meeting the required standards.

In order that those skilled in the art may better understand how the present invention can be carried into effect, the following examples are given by way of illustration and not by way of limitation. All parts and percentages are by weight unless otherwise stated.

EXAMPLE 1

This example illustrates the preparation of a 1:1 adduct of polymerized tetrahydrofuran (PTHF) having a molecular weight of 1040 with 1,3-propane sultone (PS).

Poly(tetrahydrofuran)—156 g. (0.15 mole)
1,3-propane sultone—18.3 g. (0.15 mole)
NaOH (dissolved in 25 ml. water)—12.0 g. (0.3 mole)
Benzene—100 ml.
Toluene—150 ml.

The aqueous solution of NaOH is added to the poly(tetrahydrofuran) in the benzene-xylene solution, and water is separated by azeotropic distillation in a Dean-Stark trap. A total of 25 ml. of water from the aqueous NaOH plus 2.7 ml. of water obtained as a by-product of the reaction is collected.

The resulting monoalkoxide of poly(tetrahydrofuran) in benzene-xylene dispersion is cooled to ambient temperature (about 20°–30° C.), and the 1,3-propane sultone is added. An immediate reaction occurs with the formation of a gelatinous reaction mass. The 1:1 adduct is not further isolated but is used as a gelatinous suspension of the adduct as described in one of the examples that follows.

EXAMPLE 2

This example illustrates the preparation of a 1:2-adduct of poly(tetrahydrofuran), M.W. 1040, with 1,3-propane sultone by a different method from that used in Example 1.

|   | Grams | Moles |
|---|---|---|
| Poly(tetrahydrofuran) | 104.0 | 0.10 |
| 1,3-propane sultone | 24.4 | 0.20 |
| Metallic sodium | 4.6 | 0.20 |
| Xylene | ¹ 200 |   |

¹ Ml.

Into a one-liter, three-necked flask equipped with a nitrogen sparge, a thermometer, and a mechanical stirrer are placed the dry xylene solution of the poly(tetrahydrofuran) and small pellets of metallic sodium. The reaction vessel is heated, by means of an oil bath, at 125° C. for 14 hours while maintaining the contents of the vessel under a nitrogen blanket with constant stirring. At the end of this period of time all the added metallic sodium has completely reacted. The reaction mass is then cooled to 115° C., and molten 1,3-propane sultone is slowly added over a period of 45 minutes. The addition of the sultone is accompanied by an exothermic reaction such that the temperature increases from 115° C. to 140° C. over the 45-minute period. The reaction mass is then allowed to reflux for an additional hour. A very clear, transparent, reaction product results. Upon cooling to room temperature, the product tends to separate in gel form from the solution. The reaction mass is evaporated to dryness in a vacuum oven, leaving a quantitative yield of a white, waxy solid which is an adduct of 1,3-propane sultone and poly(tetrahydrofuran).

EXAMPLE 3

Same as in Example 1 with the exception that the starting poly(alkylene oxides) and sultones used in the preparation of the adduct are as follows:

(A) Poly(ethylene oxide), M.W. ca. 750, and 1,3-propane sultone
(B) Poly(propylene oxide), M.W. ca 2000, and 1,3-propane sultone
(C) Poly(tetrahydrofuran), M.W. 1040, and 1,8-naphthosultone
(D) Poly(tetrahydrofuran), M.W. 1040, and 1,4-butane sultone
(E) Poly(tetrahydrofuran), M.W. 1040, and 1,4-pentane sultone
(F) Poly(tetrahydrofuran), M.W. 1040, and 1,3-octane sultone

EXAMPLE 4

This example illustrates the use of the 1:1 and the 1:2 adducts of PTHF and PS of Examples 1 and 2 as modifiers of homopolymeric acrylonitrile having an inherent viscosity of 1.58 as measured using a 0.1 weight percent concentration thereof in DMF at 25° C. In each case the adducts are used in the ratio of 10 parts by weight of the adduct to 90 parts by weight of the acrylonitrile homopolymer, calculated on a net dry solids basis. The blends are made in solution states as follows:

A sample of the dry, white, powdery acrylonitrile homopolymer is dissolved with agitation and heating (about 75° C.) in dimethylacetamide (N,N-dimethylacetamide) in an amount such as will provide a solution containing 18% of the homopolymeric AN solids. To two separate portions of 118 grams each of the resulting solution there is added the equivalent of 2 grams, calculated on a solids basis, of the crude, solvent-containing sultone adducts of PTHF, one of which was the 1:1 adduct and the other was the 1:2 adduct. Heating and stirring of the solutions containing the adduct are continued until substantially homogeneous compositions have been obtained. The maximum temperature of heating with agitation is about 95° C.

A control sample containing 20 weight percent homopolymeric AN solids dissolved in DMA solvent is similarly prepared.

Films, about 10 to 15 mils thick of the solution of the control sample (unmodified homopolymeric AN) and of the test specimens) sultone-adduct-modified homopolymeric AN) are cast on glass plates. These films are dried in a vacuum oven at a temperature of about 60° C. for about 16 hours. The films are stripped from the substrate and dyed in a Sevron Blue B (Basic Blue, Colour Index Number 21) dye bath containing the following ingredients:

Distilled water—1800 ml.
Sevron Blue B, a cationic dye—0.90 g.
Triton® X–102[1] (surfactant)—0.90 g.
Sodium acetate—0.30 g.
Glacial acetic acid—0.6 ml.
Latyl® carrier A[2]—9.00 g.

[1] Triton is a registered trademark of Rohm and Haas Company, Philadelphia, Pa. It is octylphenoxy(polyethoxy)ethanol containing about 10 moles of combined ethylene oxide.
[2] Latyl is a registered trademark of E. I. du Pont de Nemours and Company, Philadelphia, Pa. Latyl carrier A is understood to be a mixture of dimethyl terephthalate and benzanilide.

The films are treated in the hot dye solution for 1 hour at 97° C., then rinsed in a 1% green soap solution for another hour at 72° C.

The film of the control sample is substantially unstained. In marked contrast both films of the test samples are dyed to a deep shade of blue, the depths of shade being such that the colors were indistinguishable.

The adduct-modified homopolymeric acrylonitrile solutions described above can be wet-spun into 3-denier filaments following the general procedure described in U.S. Patent No. 2,615,866. These solutions also can be dry-spun using the apparatus and following the procedure illustrated in Example 6 of U.S. Patent No. 2,821,521. Both the wet-spun and the dry-spun filamentary materials are dyeable to deep shades with a basic dye.

EXAMPLE 5

This example illustrates the use of the 1:1 adduct of PTHF and PS of Example 1 as a modifier of a copolymer of acrylonitrile and methyl acrylate (MA) having an inherent viscosity of 1.28. It is prepared by the emulsion copolymerization of these monomers wherein the proportions of monomers in the charge are 92.7% AN and 7.3% MA. Copolymerization is effected at 45° C. using sodium lauryl sulfate as a surfactant in an aqueous surfactant solution acidified with sulfuric acid, and a redox-sodium metabisulfite. In the binary copolymer that is thereby produced the proportions of the units or mers of the individual starting monomers are of the same general order as those of the charge.

A solution of the finely divided AN/MA copolymer is prepared by dissolving the copolymer in DMA in the amount and in the manner described in Example 3 with reference to the dissolution of homopolymeric AN. This solution is modified with the 1:1 adduct of Example 1 as described in Example 3 with the exception that the amount of the crude, gelatinous 1:1 adduct that is added to the aforementioned solution is such that the solution contains 19% AN/MA copolymer and 1% of the said adduct on a solids basis; that is, in weight proportions with respect to each other of 95% copolymer and 5% sultone adduct of poly(tetrahydrofuran).

A control sample containing 20% weight percent of the AN/MA copolymer in DMA solvent is similarly prepared.

Films, about 10 to 15 mils thick, of the solution of the control sample and of the test specimen are cast on glass plates, oven-dried, stripped from the plates and dyed as described in Example 3.

The film of the control sample is barely stained, although more so than the corresponding control sample of Example 3 wherein the polymer was homopolymeric acrylonitrile. In marked contrast the film of the test sample was dyed to a deep shade of blue.

Similar results are obtained when methyl acrylate in the above-described copolymer with acrylonitrile is replaced by methyl methacrylate, vinyl acetate, styrene or other ethylenically-unsaturated monomer that is free from dye sites and which is copolymerizable with acrylonitrile. Numerous examples of such monomers have been given hereinbefore and in the cited art.

EXAMPLE 6

Same as in Example 4 with the exception that, instead of using the 1:1 or 1:2 adducts of poly(tetrahydrofuran) and 1,3-propane sultone, there are used in individual preparations the adducts of Example 3, which are there identified as A through F, in imparting cationic dye-receptivity to homopolymeric acrylonitrile. A control run using a DMA solution of the acrylonitrile homopolymer for the casting of a film is also carried out as described in Example 4. Similar results from the dye test are obtained when the control and test films are compared in the manner and with the results set forth in Example 4.

The cationic dye-receptive, sultone-adduct-modified polymer (including acrylonitrile polymer) compositions of this invention may be modified (for example, when they are to be shaped to form filaments, films, and the like) by incorporating therein any of the additives or modifiers commonly incorporated into such products. Such additives include U.V. absorbers, antioxidants, stabilizers, pigments, plasticizers, fillers, delusterants, e.g., TiO₂, and flame retardants. More specific examples of the latter are, for example, polyvinyl chloride and bromide, and polyvinylidene chloride and bromide (especially the chlorides), and which may constitute from 10 to 20 percent by weight of the composition (solids basis). When such flame retardants are employed, then stabilizers for them also are usually included, e.g., organic tin salts such as dibutyl tin laurate. The compositions also may contain auxiliary flame retarders, e.g., Sb₂O₃, which can function both as a flame retardant and as a delusterant.

It will be understood, of course, by those skilled in the art that the present invention is not limited only to the particular starting reactants, proportions thereof and methods of preparation given by way of illustration in the foregoing examples. Thus, instead of the particular sultones employed in making the adducts of Examples 1 through 3 there may be employed any other sultone of the kind embraced by Formula I or any of the isomers of 1,8-naphthosultone. Also, instead of the poly(ethylene oxide), poly(propylene oxide), and poly(tetrahydrofuran) having the particular average molecular weights employed in, for instance, Example 3 there may be used any other such poly(alkylene oxides) having average molecular weights different from those set forth in Example 3 and which are within the range of from about 500 to about 5000.

Various other dye-resistant, more particularly cationic dye-resistant, polymers and copolymers other than the specific homopolymeric and copolymeric acrylonitriles of the various examples may be used alone, or admixed with acrylonitrile homopolymer and/or copolymer, as the primary polymerization product the cationic dye-receptivity of which is improved by modification with a sultone-poly(alkylene oxide) adduct of this invention. Illustrative examples of such polymers are cellulose acetate; cellulose triacetate; poly(ethylene terephthalate); nylon-6,6; homopolymeric vinylidene cyanide; copolymers of vinylidene cyanide with vinyl acetate or with one or more other comonomers of which numerous examples are given in the aforementioned U.S. Patent No. 3,180,857; and the various other cationic dye-resistant polymers that will be apparent to those skilled in the art from the foregoing illustrative examples.

It is to be understood that the foregoing detailed description is given merely by way of illustration and that many variations may be made therein without departing from the spirit and scope of the invention.

The embodiments of the invention in which an exclusive property or privilege is claimed are defined as follows:

1. A composition of matter comprising a reaction product of (a) a polymer of a cyclic ether selected from the group consisting of poly(ethylene oxide), poly(propylene oxide) and poly(tetrahydrofuran), said cyclic ethers having an average molecular weight within the range of from about 500 to about 5000, (b) a sultone selected from the group consisting of the naphthosultones and sultones represented by the general formula

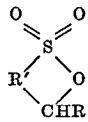

wherein R represents hydrogen or a lower alkyl radical and R' represents an alkylene or arylene radical containing from 1 to 6 carbon atoms inclusive, (c) and an alkali metal or alkali metal hydroxide admixed with an acrylonitrile-containing polymer of at least about 40 percent acrylonitrile, wherein the reaction product constitutes from 1% to about 25% by weight of the total amount of the reaction product and the polymer.

2. The composition as in claim 1 wherein the cyclic ether of (a) is poly(tetrahydrofuran).

3. The composition as in claim 1 wherein the sultone of (b) is 1,3-propane sultone.

4. The composition as in claim 1 wherein the cyclic ether of (a) is poly(tetrahydrofuran) and the sultone of (b) is 1,3-propane sultone.

5. A composition as in claim 4 in which the reaction product is a 1:1 molar product of poly(tetrahydrofuran) and 1,3-propane sultone.

6. A composition as in claim 4 in which the reaction product is a 1:2 molar product of poly(tetrahydrofuran) and 1,3-propane sultone.

7. The composition of claim 1 dissolved in a solvent therefor.

8. The composition of claim 1 in the form of a shaped article.

9. The shaped article of claim 8 dyed with a cationic dye.

10. The composition of claim 8 wherein the shaped article is a fiber.

11. A composition as in claim 1 wherein the polymer is homopolymeric acrylonitrile or a copolymer of acrylonitrile and at least one other ethylenically-unsaturated monomer which is copolymerizable with acrylonitrile and is free from cationic dye sites.

12. A composition of matter comprising (a) the reaction product of claim 4 admixed with (b) homopolymeric acrylonitrile or a copolymer of at least 85% acrylonitrile units and up to 15% of units of at least one other ethylenically-unsaturated monomer which is copolymerizable with acrylonitrile and is free from cationic dye sites.

13. A composition as in claim 11 in the form of filamentary material.

14. A composition as in claim 13 wherein the reaction product is a reaction product of poly(tetrahydrofuran) and 1,3-propane sultone, and it constitutes from 2% to about 20% by weight of the total amount of the said reaction product and the defined dye-resistant polymer.

15. A solution of the composition of claim 11 dissolved in an organic solvent in a concentration of from about 5% to about 35% by weight of the solution, the reaction product therein constituting from 1% to about 25% by weight of the total amount of the said adducts and the defined dye-resistant polymer, said solution being adapted to be wet-formed into a cationic, dye-receptive shaped article.

16. A solution as in claim 15 wherein the organic solvent is N,N-dimethylacetamide.

17. The process which comprises extruding the solution of claim 15 through an opening of predetermined cross-section into a liquid non-solvent for the solid composition contained in the said solution thereby to form a shaped article.

References Cited

UNITED STATES PATENTS

| | | | |
|---|---|---|---|
| 2,454,543 | 11/1948 | Bock | 260—512 |
| 3,164,574 | 1/1965 | Witte. | |
| 3,242,127 | 3/1966 | Clark et al. | |
| 3,341,599 | 9/1967 | Bormann et al. | 260—615 |

ALLAN LIEBERMAN, Primary Examiner

H. H. FLETCHER, Assistant Examiner

U.S. Cl. X.R.

8—31, 55, 89, 90, 100; 260—41, 85.5, 88.7, 327, 512

UNITED STATES PATENT OFFICE
CERTIFICATE OF CORRECTION

Patent No. 3,502,607  Dated March 24, 1970

Inventor(s) Louis E. Trapasso

It is certified that error appears in the above-identified patent and that said Letters Patent are hereby corrected as shown below:

Column 2, line 17, "naphthasultones" should read --naphtholsultones--;

Column 7, line 6, "dye-resistor" should read --dye-resistant--;

Column 8, line 22, after "polymeric", insert --material--;

Column 8, line 58, "of" should be --or--;

Column 12, line 28, after "redox-", insert --catalyst system consisting of potassium persulfate and--

SIGNED AND SEALED
SEP 15 1970

(SEAL)
Attest:

Edward M. Fletcher, Jr.
Attesting Officer

WILLIAM E. SCHUYLER, JR.
Commissioner of Patents